(12) United States Patent
Liu

(10) Patent No.: US 7,693,054 B2
(45) Date of Patent: Apr. 6, 2010

(54) METHOD FOR IMPLEMENTING RESOURCES RESERVATION IN ACCESS CONFIGURATION MODE IN NEXT GENERATION NETWORK

(75) Inventor: Enhui Liu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 11/659,639

(22) PCT Filed: Jun. 29, 2006

(86) PCT No.: PCT/CN2006/000292

§ 371 (c)(1),
(2), (4) Date: Jul. 16, 2007

(87) PCT Pub. No.: WO2006/094447

PCT Pub. Date: Sep. 14, 2006

(65) Prior Publication Data

US 2007/0248106 A1    Oct. 25, 2007

(30) Foreign Application Priority Data

Mar. 8, 2005    (CN) .................. 2005 1 0053507

(51) Int. Cl.
*H04L 12/56* (2006.01)
(52) U.S. Cl. ............... 370/230; 370/229; 370/401
(58) Field of Classification Search ........... 370/235, 370/401, 229, 230
See application file for complete search history.

(56) References Cited

U.S. PATENT DOCUMENTS 5,091,946 A * 2/1992 Ozawa .................. 704/208
5,890,108 A * 3/1999 Yeldener ................ 704/208
6,061,649 A * 5/2000 Oikawa et al. .......... 704/226
7,155,385 B2 * 12/2006 Berestesky et al. ...... 704/215

(Continued)

FOREIGN PATENT DOCUMENTS

KR    2004-0001203    1/2004

(Continued)

OTHER PUBLICATIONS

International Search Report for International Application No. PCT/CN2006/000292, dated Jun. 15, 2006.

(Continued)

*Primary Examiner*—William Trost, IV
*Assistant Examiner*—Mewale Ambaye
(74) *Attorney, Agent, or Firm*—Darby & Darby P.C.

(57) ABSTRACT

A method for implementing resources reservation in an access configuration mode in an NGN, including: when a subscriber accesses a network, an NAAF sending a resources request message to a resources mediation PDF; after receiving the resources request message, the resources mediation PDF making an admission decision according to network operator policy rules and availability of resources, send an admission installation command to a BGF, setting and keeping the corresponding admission decision parameters information in the BGF. Thus, the BGF performs packet forwarding operations as classifying, marking, shaping, and discarding on the user traffic entering the network according to the admission decision information so as to ensure the QoS class required by the user. Therefore, an applicable solution for implementing resources reservation in the access configuration mode in the NGN is provided.

22 Claims, 5 Drawing Sheets

U.S. PATENT DOCUMENTS

2008/0004027 A1 * 1/2008 Chen et al. .................. 455/445

FOREIGN PATENT DOCUMENTS

| KR | 2004-0028327 | 4/2004 |
| KR | 2004-0073629 | 8/2004 |

OTHER PUBLICATIONS

ETSI Standard, "NGN Functional Architecture; Network Attachment Subsystem; Release 1," Draft ETSI ES 02021 V0.2.3, pp. 1-23 (2004).

ETSI Standard, "NGN Functional Architecture; Resource and Admission Control Subsystem (RACS); Release 1," Draft ETSI ES 2XX XXX V<1.1.0> (2004).

ITU WG3, "Revision 1 of TR-RACS, FGNGN-OD000074," ITU-T Internal Document, International Telecommunication Union, pp. 1-22 (2004).

Prior et al., "Heterogeneous Signaling Framework for End-to-End QoS Support in Next Generation Networks," Proceedings of the 38th Hawaii International Conference on System Sciences, pp. 1-10 (2005).

European Search Report for Application No. 06705701.8-2416, dated Jul. 26, 2007.

* cited by examiner

METHOD FOR IMPLEMENTING RESOURCES RESERVATION IN ACCESS CONFIGURATION MODE IN NEXT GENERATION NETWORK

This application is a U.S. national phase application under 35 U.S.C. §371 of International Patent Application No. PCT/CN06/00292 filed Feb. 28, 2006, and claims the benefit of priority of CN Patent Application No. 200510053507.4 filed Mar. 8, 2005. The International Application was published in the Chinese language on Sep. 14, 2006 as WO 2006/094447.

FIELD OF THE INVENTION

The present invention relates to the field of network communications, and more particularly, to a method for implementing resources reservation in an access configuration mode in a next generation network.

BACKGROUND OF THE INVENTION

In a next generation network (NGN), packet techniques such as IP are adopted as a bearer network technique to integrate fixed communications and mobile communications. The NGN network is an integrated network that makes use of IP connectivity among telecommunication entities to carry various types of telecommunication services such as voice, image, and data and so on. Although the deployment of NGN has already begun, such problems as quality of service (QoS), security, reliability, operability and manageability of the IP bearer network still need a perfect solution.

Two international standard organizations, ITU-T and ETSI, have respectively set up a special research group dedicated to draft the standards for NGN technique, which are in an architecture stage at present. It has become an agreement of a majority of main operators and venders to use a resource and admission control subsystem (RACS) to solve the problems of QoS, network address translation (NAT), and firewall traversal within the NGN bearer network.

The scopes of the RACS drafts of the two organizations are different, e.g. the ITU-T FGNGN considers the packet transport parts of core networks besides the packet transport parts of access networks; but the architectures of the two organizations are similar and compatible. Both of them make reference to an idea of admission control based on operation policy rules at edges of the network, which is used by 3GPP PDF (3rd generation partner project policy decision function) and PacketCable GC (Gate Controller). The result of checking transport resource availability within networks is added to both RACS drafts to serve as one of the conditions of admission control, so that unacceptable congestion, delay or packet loss for the application layer, which may result from that service traffic and their QoS class requirements exceed the network bearer capabilities, are avoided. At the same time, NAT, firewall traversal and support of various NGN multimedia services are taken into consideration in both RACS drafts.

The architecture definition in the current RACS drafts has been substantially stable and the RACS functional architecture needs to support various types of resources reservation mechanisms. At present, there are the following three resources reservation modes.

(1) Proxy-requested Mode

Service control equipment initiates a resources request to the resource and admission control layer on behalf of the user. The service control equipment can extract the explicit bandwidth and QoS requirements of the media flows of the session which are contained in the user service request signaling, or determine the bandwidth and QoS requirements of the media flows of the session according to the operation policy rules (for example, service type or encoding/decoding type) of the service layer.

(2) CPE-requested Mode

Customer premises equipment (CPE) initiates a resources request to the network through a dedicated path coupling signaling. The resources request can be initiated for each session or be initiated concerning no session. The resources request can either be authorized in advance by the service control device or not.

(3) Access Configuration Mode

When a subscriber accesses the network, network access management equipment initiates a resources request to the network according to subscriber service level agreement (SLA) information in the subscriber configuration file. The resource request is in per subscriber-level and has no association with the sessions.

The structure of the functional architecture of RACS is provided in the latest RACS draft which is released by the ITU-T FGNGN in December, 2004, as shown in FIG. 1.

An application function entity (AF) refers to a service layer function entity which requests for resource and admission control and requests the resources reservation and release for application media flows; the AF includes such function entities as a session control proxy function (SCPF), an interconnection border control function (IBCF) and the like.

An network access attachment function (NAAF) refers to functions which are in charge of network access management control; the NAAF includes network access authentication, authorization and dynamic IP address allocation of subscriber equipment, configuration for access equipment, storage of subscriber configuration files and the like.

A Resources mediation entity (RM) receives the resources request, checks whether the resources requests are consistent with the operation policy rules, interacts with related functions to check whether the resources requests are consistent with the subscriber configuration information stored in a subscriber configuration database and whether there are idle and available transport resources within networks meeting the resources reservation requirements, and makes an admission decision according to the above checking results. The resources mediation entity includes a mediation policy decision function entity (M-PDF) located in the service access side and an interconnection policy decision function entity (I-PDF) located in the service interconnection side.

A transport resources control function entity (TRCF) receives a resources request from the resources mediation functions, checks whether there are idle and available transport resources within networks for the resources request according to the collected and maintained network topology and resources status database, and controls the QoS related forwarding actions of transport equipment in networks. If there are multiple transport resources control function entities in one network, these entities communicate with each other to check the availability of transport resources from the ingress edge to the egress edge within the whole network. A transport resources control function entity includes a transport resources control function entity located in the access network (A-TRCF) and a transport resources control function entity located in the core network (C-TRCF).

A border gateway function entity (BGF) of the core network receives, stores and executes information of admission decision parameters received from the resource and admission control layer, performs packet filtering, traffic classification, marking, policing and shaping, and may further perform network address translation and security inspect filtering on packets.

The functional architecture of RACS is also provided in the latest RACS draft which is released by the ETSI TISPAN in January, 2005, as shown in FIG. 2.

An application function (AF) refers to a service layer function entity which requests for the resource and admission control and requests the resources reservation and releasing for an application media flow.

A network additional subsystem function (NASS) refers to functions which are in charge of network access management control; the NASS includes network access authentication, authorization and dynamic IP address allocation for subscriber equipment, configuration for access equipment, storage of subscriber configuration files and the like.

A service-based policy decision function (SPDF) receives a resources request, checks whether the resources request are consistent with the operation policy rules, interacts with an access network resources admission and control function (A-RACF) to check whether there are idle and available transport resources in access networks meeting the requirements, and then makes an admission decision according to the above checking results.

The A-RACF receives a resources request from the SPDF, detects whether there are idle and available transport resources in the access network meeting the requirements, and controls the QoS-related forwarding actions of transport equipment in networks for assuring the QoS.

A border gateway function entity of the core network (C-BGF) receives, stores and executes information of admission decision parameters received from the resource and admission control layer, performs packet filtering, traffic classification, marking, policing and shaping, and may perform network address translation and security inspect filtering on packets.

SUMMARY OF THE INVENTION

Embodiments of the present invention provide a method for implementing resources reservation in an access configuration mode in a next generation network (NGN) so as to enable the existing RACS functional architecture to implement processing for resources reservation in the access configuration mode.

According to embodiments of the present invention, a method for implementing resources reservation in an access configuration mode in a next generation network (NGN), includes:

when a user terminal accesses the network, a network access additional function entity (NAAF) sending a resources request message to a resources mediation policy decision function entity (PDF) according to a subscriber service level agreement in a subscriber configuration file, wherein the resources request message carries resources requirement parameters information requested by a user traffic;

after receiving the resources request message, the resources mediation PDF checking whether the corresponding resources request is consistent with related network operation policy rules, and checking whether there are available resources meeting the resources requirement in the related transport networks, and making an admission decision for the corresponding resources request according to a checking result;

if the corresponding resources request is admitted, the resources mediation PDF sending an admission installation command to a border gateway function entity (BGF), and setting corresponding admission decision parameters information in the BGF; and the BGF performing forwarding operations on the user traffic entering the network according to the admission decision parameters information.

It can be seen from the technical solutions provided by embodiments of the present invention that, in an access configuration mode, a subscriber-level QoS management mode having no association with any sessions, e.g. classifying the subscriber QoS class into a golden medal level, a silver medal level and a copper medal level, is supported. Moreover, according to embodiments of the present invention, when the subscriber accesses the network, the NAAF may initiate a resources request according to the service level agreement (SLA) information of the subscriber. After the subscriber accesses the network, the NAAF may initiate a request for modifying, activating, de-activating, or releasing resources, as needed by management; and the NAAF may also provide a corresponding manner for processing resources reservation if the resources are not available. Therefore, the resources reservation in the access configuration mode in the NGN is implemented.

DETAILED DESCRIPTION OF THE INVENTION

Embodiments of the present invention provide a solution to implement resources reservation in an access configuration mode of an NGN resource and admission control subsystem.

The present invention is described in detail in conjunction with the accompanying drawings and embodiments hereinafter.

The access configuration mode refers to that, when a subscriber accesses the network, network access management equipment initiates a resources request to the network according to service level agreement information of the subscriber included in a subscriber configuration file. The resources request is in per subscriber-level and has no association with the session.

In order to support a subscriber-level QoS management mode having no association with the session, such as classifying the subscriber QoS classes into a golden medal level, a silver medal level and a copper medal level, according to embodiments of the present invention, when the subscriber accesses the network, an network access additional function entity (NAAF) initiates a resources request for the user traffic based on the service level agreement information of the subscriber. After the subscriber accesses the network, the NAAF may initiate a request for modifying, activating, pausing or releasing resources in dependence on management requirements. The NAAF refers to functions related to network access management control, including: network access authentication, authorization and dynamic IP address allocation for subscriber equipment, configuration for access equipment, and storage of subscriber configuration file and the like.

The detailed implementation of the method provided by embodiments of the present invention, namely the method for implementing resources reservation in the access configuration mode of the NGN resource and admission control subsystem, will be described hereinafter.

Figure 1:
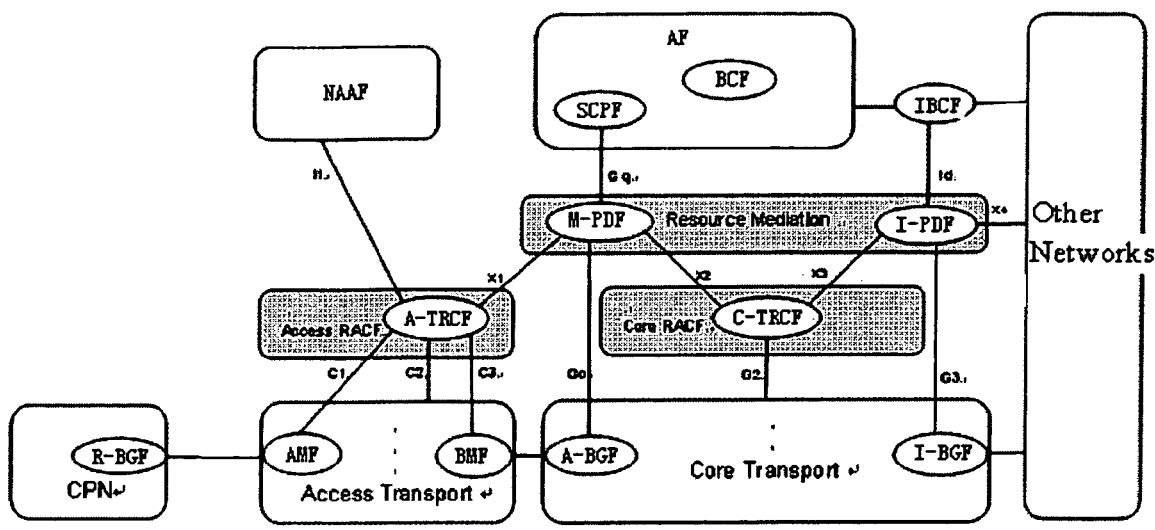
FIG. 1 is a schematic diagram illustrating the system architecture of RACS provided by the ITU-T FGNGN.
Figure 2:
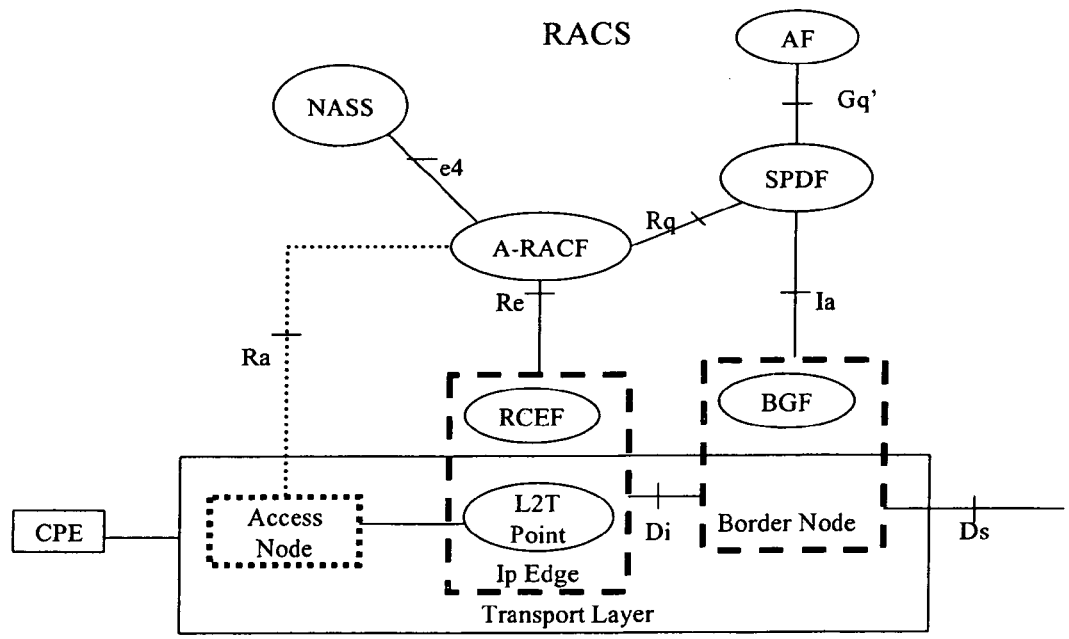
FIG. 2 is a schematic diagram illustrating the system architecture of RACS provided by the ETSI TISPAN.

Since the RACS functional architecture of the ETSI TIS-PAN corresponds to the access part of the RACS architecture of the ITU-T FGNGN, and therefore is a subsystem compatible therewith, the embodiments of the present invention are described based on the RACS architecture of the ITU-T FGNGN which is shown in FIG. 1. In the access configuration mode of the RACS architecture, the resources request is initiated by the NAAF. Practically, the method and process provided by the embodiments of the present invention are applicable to the RACS architecture of the ETSI TISPAN. In the access configuration mode of the RACS architecture of the ETSI TISPAN, the resources request is initiated by a network attachment sub-system (NASS).

Figure 3:
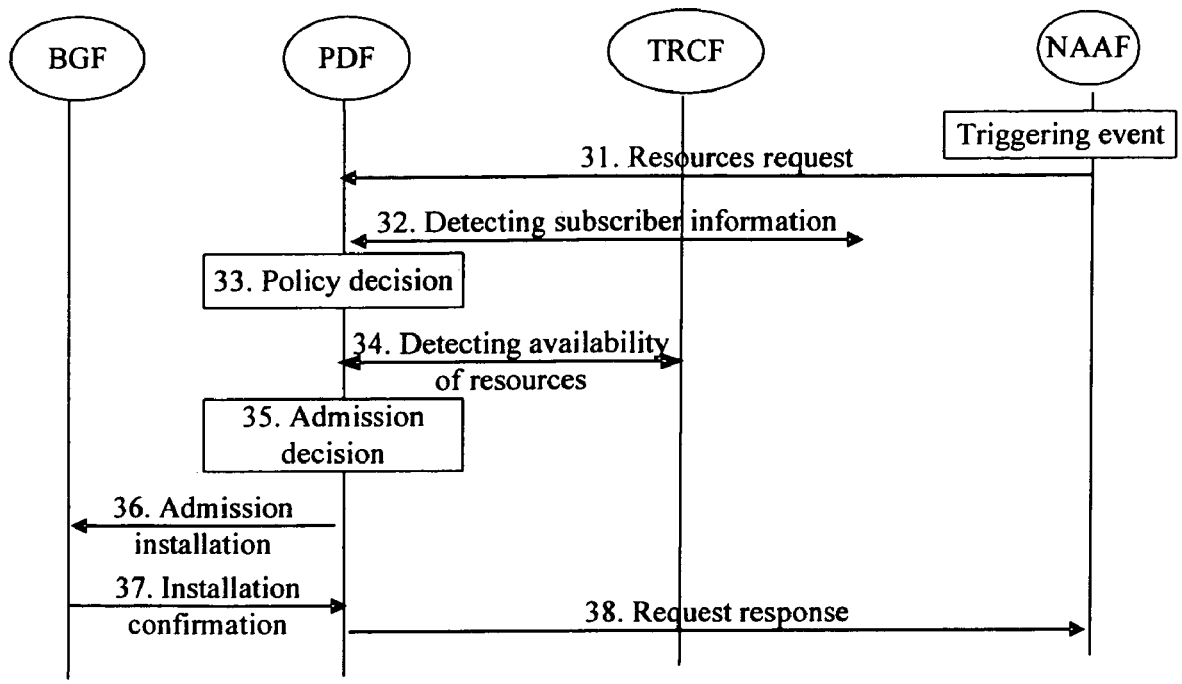
FIG. 3 is a schematic diagram illustrating the process of an NAAF initiating a resources request according to an embodiment of the present invention.

According to embodiments of the present invention, the process of initiating a resources request is shown in FIG. 3, which in detail includes the following steps.

Step 31: When a subscriber accesses the network, the NAAF initiates a resources request for the user traffic according to the subscriber service level agreement information included in the subscriber configuration file; in other words, the NAAF initiates a resources request message to a resources mediation PDF policy decision function entity (PDF).

The resources request message carries resources requirement parameters information desired by the subscriber including a user traffic ID (such as IPv4 quintuple information and the like), bandwidth requirement parameters information, QoS requirement parameters information and so on.

Moreover, the resources request is in the subscriber-level and has no association with the session.

Step 32: after receiving the resources request from the NAAF, the resources mediation PDF makes a policy-based decision according to network operation policy rules, that is, makes a policy decision.

The resources mediation PDF uses the network operation policy rules stored locally or in a remote policy storage server to make the policy-based decision. The resources mediation PDF checks whether the resources request is consistent with the network operation policy rules; if the resources request is consistent with the network operation policy rule, proceed to Step 33; otherwise, directly proceed to Step 37, which is to return a request response including a rejection reason to the NAAF.

Step 33: the resources mediation PDF interacts with a transport resources control function entity (TRCF), which is in charge of controlling network performance, to make a resources-based decision. That is, the resources mediation PDF checks whether there are idle and available transport resources consistent with the resources requirement within the involved network.

The specific process includes the following steps: the resources mediation PDF positioning and determining the TRCF within the involved access networks and core networks along the resources path according to the resources request information, and forwarding the resources request to the TRCF; the TRCF checking the availability of the transport resources within the network, and then returning a checking result of the availability of transport resources to the resources mediation PDF.

In order to control and ensure the network performance, the TRCF may perform status collection and parameter configuration on the routing and forwarding actions of the network transport equipment.

Step 34: the resources mediation PDF makes a final admission control decision for the resources request according to the checking result of the availability of transport resources returned by the TRCF. If the corresponding final admission control decision of the resources request is "allowed", proceed to Step 35; otherwise, directly proceed to Step 37, which is to directly return a request response including a rejection reason to the NAAF.

Step 35: the PDF initiates an admission installation command to a border gateway function (BGF) to install the final admission control decision in the BGF.

The PDF sends the resources requirement parameters information of a subscriber terminal in a corresponding format to the BGF simultaneously. The BGF stores the resources requirement parameters information as the admission decision parameters information and regards the admission decision parameters information as a basis for controlling the passing service traffic.

The admission decision parameter information includes a user traffic ID, a priority, bandwidth and so on.

After installing the admission control decision locally, that is, storing the admission decision parameters information, the BGF proceeds to Step 36, in which an installation confirmation message is returned to the resources mediation PDF.

Step 37: after receiving the admission installation confirmation message, the resources mediation PDF returns a resources request response message indicating acceptance to the NAAF.

Therefore, a process of the NAAF initiating a resources request is terminated and the resources reservation is implemented.

According to the embodiments of the present invention, the NAAF may initiate modification for resources reservation including modification of address, bandwidth, QoS class, and so on. The events triggering the NAAF to initiate a modification for resources reservation include changes of subscriber service level agreement information or internal actions.

Figure 4:
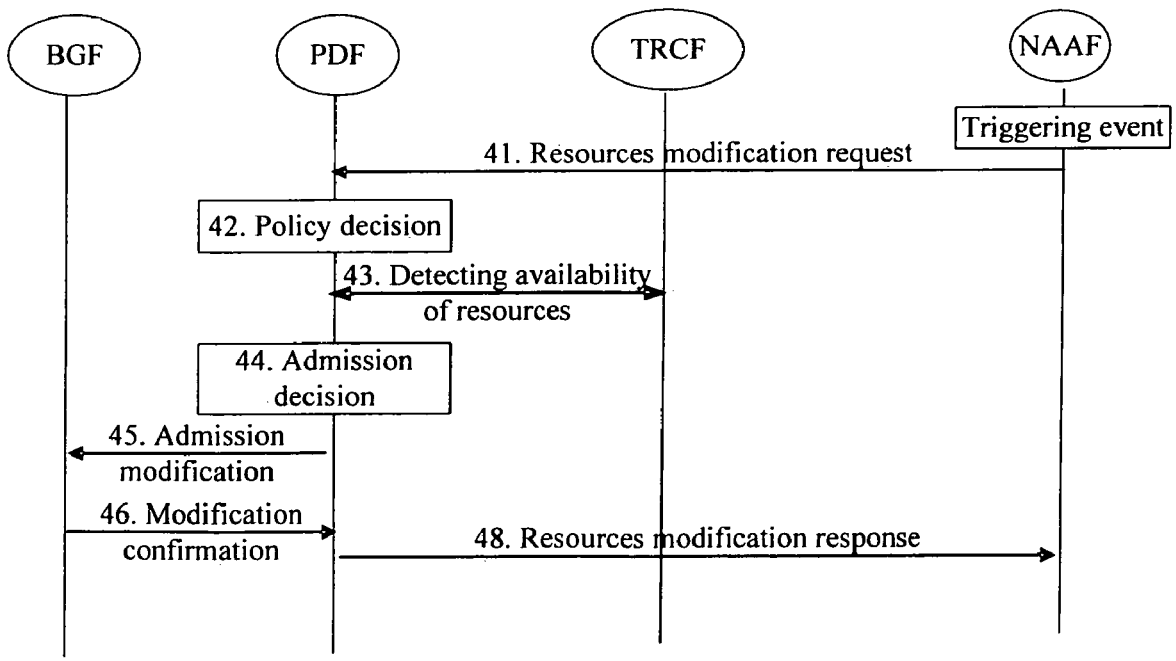
FIG. 4 is a schematic diagram illustrating the process of an NAAF initiating a resources reservation modification request according to an embodiment of the present invention.

The process of the NGN resource and admission control subsystem handling a resources modification request initiated by the NAAF is shown in FIG. 4, and includes the following steps.

Step 41: when an event happened triggers the modification for resources reservation, the NAAF sends a resources modification request message to the PDF.

The resources modification request message includes the new resources requirement parameters information required by a subscriber, such as IPv4 quintuple information, bandwidth requirement information, QoS requirement parameters information, and the like.

Step 42: after receiving the resources modification request from the NAAF, the resources mediation PDF makes a policy decision according to the network operation policy rules.

Step 43: the resources mediation PDF interacts with the TRCF to check the availability of resources.

Similarly, the resources mediation PDF positions and determines the TRCF in the involved access networks and core networks along the resources path according to the resources modification request, and forwards the resources modification request to the TRCF. The TRCF checks the availability of the resources within the network and returns the checking result of the availability of resources to the resources mediation PDF.

Step 44: the resources mediation PDF makes the final admission control decision for the resources modification request according to the checking result of the availability of resources returned by the TRCF. If the final admission control decision for the resources modification request is "allowed", proceed to Step 45; otherwise, directly proceed to Step 47, which is to directly return the resources modification request response including a rejection reason to the NAAF.

Step 45: the PDF initiates an admission modification command to the BGF.

The new resources requirement parameters information required by the subscriber is sent to the BGF together with the admission modification command, so as to facilitate the BGF in modifying the stored corresponding admission decision parameter information.

After modifying the admission control decision locally, the BGF proceeds to Step 46, in which a resources modification confirmation message is returned to the resources mediation PDF.

Step 47: after receiving the resources modification confirmation, the resources mediation PDF returns a resources modification request response indicating acceptance to the NAAF.

According to the embodiments of the present invention, the NGN resource and admission control subsystem allows the NAAF to initiate an admission activation request, that is, to request the BGF to start enforcing the previously installed admission control decision for the authorized resources requested by the resources mediation PDF. In another word, the previously installed admission control decision stored in the BGF is activated.

Figure 5:
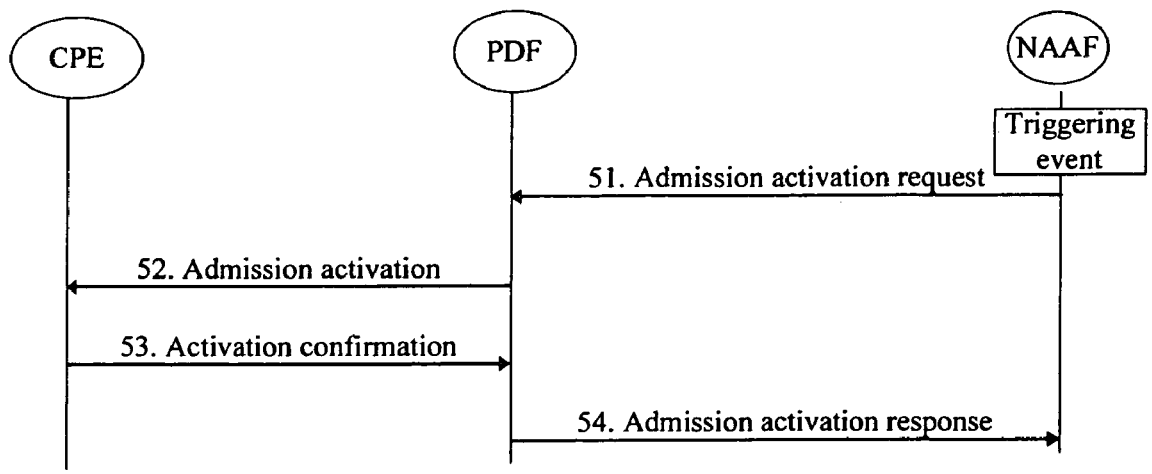
FIG. 5 is a schematic diagram illustrating the process of an NAAF initiating an admission activation request according to an embodiment of the present invention.

The process of the NGN resource and admission control subsystem handling an admission activation request initiated by the NAAF is shown in FIG. 5 and includes the following steps.

Step 51: when an event happened triggers an admission activation, the NAAF sends the admission activation request message to the resources mediation PDF.

The activation request message carries the admission decision parameters information to be activated or the corresponding identification information thereof.

Step 52: after receiving the admission activation request message, the resources mediation PDF sends an admission activation command to the BGF, which carries the admission decision parameters information to be activated or the corresponding identification information thereof to facilitate the BGF in activating the corresponding resources reservation parameters according to the corresponding information.

Step 53: after performing the activation operation on the corresponding admission decision parameters information, the BGF sends an admission activation confirmation message to the resources mediation PDF.

Step 54: after receiving the admission activation confirmation message, the resources mediation PDF returns an admission activation response message to the NAAF.

According to the present invention, the NGN resource and admission control subsystem allows the NAAF to initiate an admission de-activation request, that is, to request the BGF to stop enforcing the previously installed admission control decision for the authorized resources requested by the resources mediation PDF.

Figure 6:
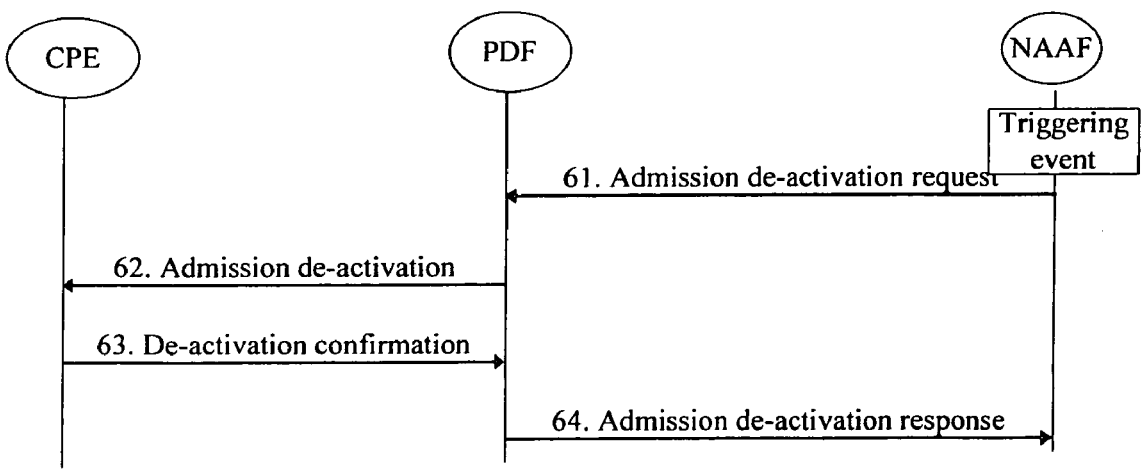
FIG. 6 is a schematic diagram illustrating the process of an NAAF initiating an admission de-activation request according to an embodiment of the present invention.

The process of the NGN resource and admission control subsystem handling an admission de-activation request initiated by the NAAF is shown in FIG. 6 and includes the following steps.

Step 61: when an event trigging an admission de-activation happens, the NAAF sends an admission de-activation request message to the resources mediation PDF. Similarly, the admission de-activation request message needs to carry resources requirement parameters information to be de-activated or the corresponding identification information thereof.

Step 62: after receiving the admission de-activation request message, the resources mediation PDF sends an admission de-activation command to the BGF, which carries the admission decision parameters information or the corresponding identification information thereof simultaneously to facilitate the BGF in determining the specific admission decision parameter information to be de-activated according to corresponding information.

Step 63: after performing the de-activation operation on the corresponding admission decision parameters information, the BGF sends an admission de-activation confirmation message to the resources mediation PDF.

The admission de-activation operation means stopping enforcing the corresponding admission decision parameters information.

Step 64: after receiving the admission de-activation confirmation message, the resources mediation PDF returns an admission de-activation response message to the NAAF.

According to the embodiments of the present invention, when the subscriber disconnects from the network, the NAAF should initiates a resources releasing request to the resources mediation PDF to release the resources reserved for the user traffic.

Figure 7:
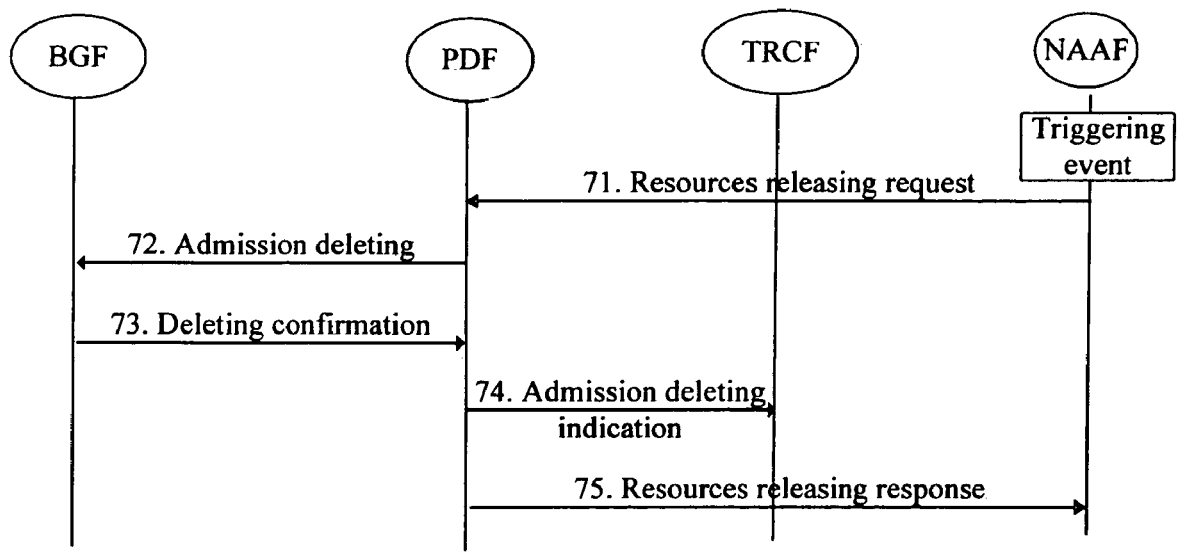
FIG. 7 is a schematic diagram illustrating the process of an NAAF initiating a resources releasing request according to an embodiment of the present invention.

The process of the NGN resource and admission control subsystem handling a resources releasing request initiated by the NAAF is as shown in FIG. 7 and includes the following steps.

Step 71: when an event happened triggers the releasing of resources, the NAAF sends a resources releasing request message to the resources mediation PDF.

The message carries resources requirement parameters information to be released or identification information thereof.

Step 72: after receiving the resources releasing request message, the resources mediation PDF sends an admission deleting command to the BGF, which carries the admission decision parameters information to be deleted or the corresponding identification information thereof so as to facilitate the BGF in deleting the corresponding admission decision parameter information stored locally.

Step 73: after deleting the corresponding admission decision parameters information, the BGF sends an admission deleting confirmation message to the resources mediation PDF.

Step 74: after receiving the admission deleting confirmation message, the resources mediation PDF needs to send an admission deleting indication message to the TRCF to facilitate the TRCF in modifying the state of the previously allocated corresponding resources into idle.

Step 75: after receiving the admission deleting confirmation message, the resources mediation PDF also needs to return a resources releasing response message to the NAAF to confirm the end of the resources releasing procedure.

Figure 8:
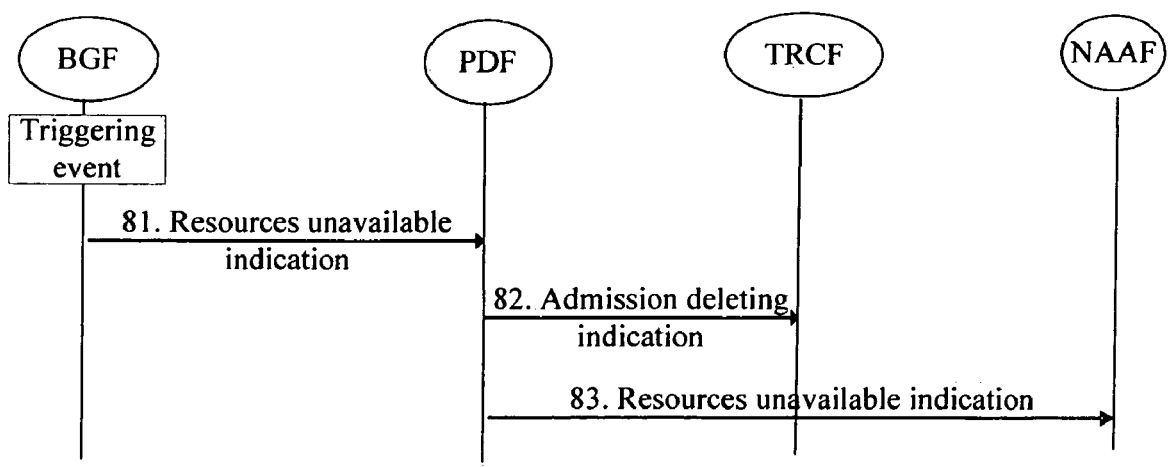
FIG. 8 is a schematic diagram illustrating the process of a BGF reporting a resources unavailable indication according to an embodiment of the present invention.

According to the embodiments of the present invention, after the subscriber accesses networks, if there are not available bandwidth resources for the authorized resources reservation due to the interface failure of the BGF, the BGF should initiatively send a resources unavailable indication to the resources mediation PDF. The corresponding process is shown in FIG. 8 and in detail includes the following steps.

Step 81: after the event happened makes the BGF unable to provide bandwidth resources for the authorized resources reservation, the BGF needs to send an unavailable indication message to the resources mediation PDF.

Step 82: after receiving the resources unavailable indication message, the resources mediation PDF needs to send an admission deleting indication message to the TRCF so as to facilitate the TRCF in releasing the resources previously allocated for the user traffic.

At the same time, if the resources reservation is initiated by the NAAF, Step 83 is needed. In Step 83, the PDF is triggered to send the resources unavailable indication message to the NAAF again so as to facilitate the NAAF in learning that the resources reserved for the NAAF is no longer available.

Figure 9:
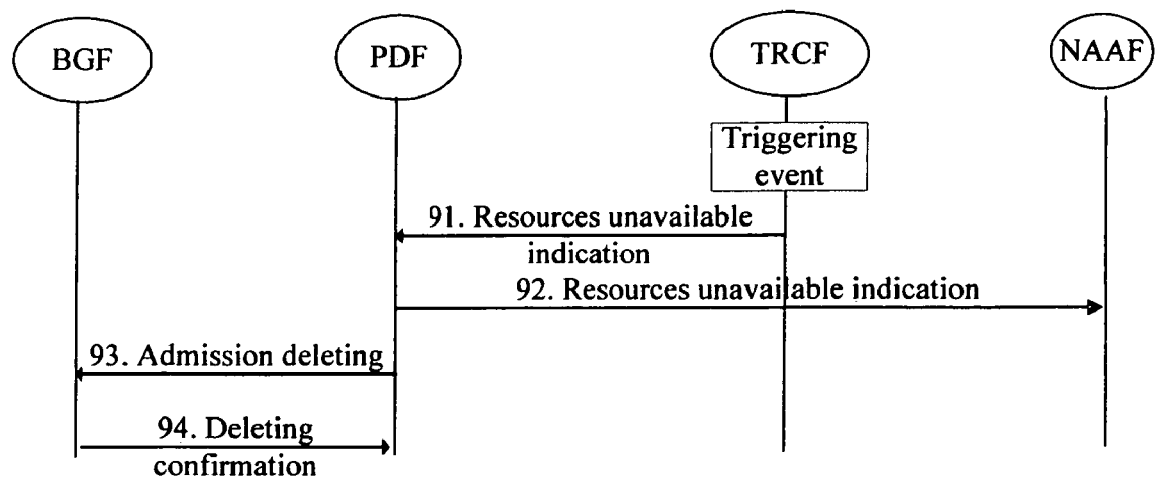
FIG. 9 is a schematic diagram illustrating the process of a TRCF reporting a resources unavailable indication according to an embodiment of the present invention.

According to the embodiments of the present invention, during the session procedure, if the TRCF finds that bandwidth resources for the related and authorized resources reservation are no longer available due to the failure of the network and the like, the TRCF should send a resources unavailable indication message to the resources mediation PDF. The corresponding detailed process is shown in FIG. 9 and in detail includes the following steps.

Step 91: when determining that bandwidth resources for the related and authorized resources reservation are no longer available, that is, finding that the network can not satisfy the forgoing resources reservation made for some user traffic, the TRCF firstly sends a resources unavailable indication message to the resources mediation PDF.

Step 92: if the resources mediation PDF determines that the resources reservation is initiated by the NAAF, the PDF sends a resources unavailable indication message to the NAAF, so as to notify the NAAF of the resources unavailable information.

Step 93: when receiving the resources unavailable indication message, the resources mediation PDF also needs to send an admission deleting or stopping command to the BGF so as to facilitate the BGF in deleting or stopping the stored admission decision parameters information.

Step 94: after deleting or stopping the corresponding admission decision parameters information, the BGF sends a deleting or stopping confirmation message to the resources mediation PDF.

To sum up, the embodiments of the present invention makes it possible for the NAAF to initiate a resources request according to the subscriber service level agreement information when the subscriber accesses the network, and to initiate a request for modifying, activating, pausing or releasing resources based on management needs after the subscriber accesses the network.

Embodiments of the present invention are applicable to the RACS functional architecture provided by the ETSI TISPAN as well. In the RACS functional architecture provided by the ETSI TISPAN, an NASS having the same function as the NAAF initiates a resources request; the PDF implements the admission control; and the BGF stores the corresponding admission decision parameters information; and in the RACS functional architecture provided by the ETSI TISPAN, an A-RACF corresponds the above-mentioned TRCF.

The foregoing is only preferred embodiments of the present invention. The protection scope of this invention, however, is not limited to the above description. Any change or substitution, within the technical scope disclosed by this invention and easily occurring to those skilled in the art, should be covered by the protection scope of this invention. Therefore, the protection scope of the present invention should be according to claims.

What is claimed is:

1. A method for implementing resources reservation in an access configuration mode in a next generation network (NGN), comprising:

sending, by a network access additional function entity (NAAF) when a user terminal accesses the network, a resources request message to a resources mediation policy decision function entity (PDF) according to a subscriber service level agreement in a subscriber configuration file, wherein the resources request message carries resources requirement parameters information requested by a user traffic;

checking, by the resources mediation PDF after receiving the resources request message, whether the corresponding request is consistent with related network operation policy rules, and checking whether there are available resources meeting the resources requirement in the related transport networks, and making an admission decision for the corresponding resources request according to a checking result;

if the corresponding resources request is admitted, sending, by the resources mediation PDF, an admission installation command to a border gateway function entity (BGF), and setting corresponding admission decision parameters information in the BGF; and performing, by the BGF, forwarding operations on the user traffic entering the network according to the admission decision parameters information.

2. The method according to claim 1, further comprising:

checking, by the resources mediation PDF after receiving a resources modification request message, whether the corresponding resources modification request is consistent with the network operation policy rules, and checking whether there are available resources meeting the resources requirement in the related transport network, and making an admission decision for the corresponding resources modification request according to a checking result;

if the resources request is admitted, sending, by the resources mediation PDF, an admission modification command to the BGF, and modifying corresponding admission decision parameter information in the BGF; and performing, by the BGF, forwarding operations on the user traffic entering the network according to the modified admission decision parameters information.

3. The method according to claim 1, further comprising:

after receiving the resources request message determining, by the resources mediation PDF, access and core networks related to the user traffic, interacting with a transport resources control function entity (TRCF) in the access networks and the core networks, checking the availability of transport resources within the networks, and sending the admission installation command or the admission modification command to the BGF after deciding that the resources are available.

4. The method according to claim 1, further comprising:
obtaining, by the resources mediation PDF, the network operation policy rules information locally or from a remote entity.

5. The method according to claim 1, further comprising:
sending, by the NAAF, an admission activation or de-activation request message to the resources mediation PDF, wherein the message carries the resources requirement parameters information to be activated or de-activated or identification information thereof;
sending, by the resources mediation PDF, an admission activation or de-activation command to the BGF, wherein the command carries the admission decision parameters information to be activated or de-activated or identification information thereof; and
after receiving the activation or de-activation command, performing, by the BGF, the activation or de-activation operations on the admission decision parameters information set for the user traffic.

6. The method according to claim 1, further comprising:
sending, by the NAAF, a resources releasing request message to the resources mediation PDF, wherein the message carries the resources requirement parameters information to be released, or identification information thereof;
sending, by the resources mediation PDF, an admission deleting command to the BGF, wherein the command carries the admission decision parameters information to be deleted or identification information thereof; and
after receiving the admission deleting command, deleting, by the BGF, the corresponding admission decision parameters information.

7. The method according to claim 1, further comprising:
after the corresponding command, returning, by the BGF, a confirmation message to the resources mediation PDF; and
sending, by the resources mediation PDF, a corresponding response message to the NAAF, wherein the response message comprising processing results information of each request.

8. The method according to claim 1, further comprising:
if the BGF can not execute the stored admission decision parameters information of the user traffic, sending, by the BGF, a resources unavailable indication message to the resources mediation PDF; and
after receiving the resources unavailable indication message, sending, by the resources mediation PDF, the resources unavailable indication message to the NAAF to notify the NAAF that the resources are not available.

9. The method according to claim 8, further comprising:
after receiving the resources unavailable indication message, sending, by the resources mediation PDF, an admission deleting indication message to a transport resource control function entity (TRCF); and
after receiving the admission deleting indication message, releasing, by the TRCF, the resources previously reserved for the user traffic.

10. The method according to claim 1, further comprising:
if the TRCF finds that the network can not satisfy the resources previously reserved for the user traffic, sending, by the TRCF, a resources unavailable indication message to the resources mediation PDF; and
after receiving the resources unavailable indication message, sending, by the resources mediation PDF, the resources unavailable indication message to the NAAF to notify the NAAF that the resources are not available.

11. The method for according to claim 10, further comprising:
after receiving the resources unavailable indication message, sending, by the resources mediation PDF, an admission deleting or stopping command to the BGF; and
after receiving the admission deleting or stopping command, enforcing the deleting or stopping, by the BGF, of the stored resources reservation parameters information, and returning a confirmation message to the resources mediation PDF.

12. The method according to claim 8, further comprising:
sending, by the resources mediation PDF, the resources unavailable indication message to the NAAF.

13. The method according to claim 1, further comprising:
if the resources request is admitted, the corresponding admission decision parameters information being stored in the BGF.

14. The method according to claim 2, further comprising:
after receiving the resources request message or the resources modification request message, determining, by the resources mediation PDF, access networks and core networks related to the user traffic, interacting with a transport resources control function entity (TRCF) in the access networks and the core networks, checking the availability of transport resources within the networks, and sending the admission installation command or the admission modification command to the BGF after deciding that the resources are available.

15. The method according to claim 2, further comprising:
after executing the corresponding command, returning, by the BGF, a confirmation to the resources mediation PDF; and
sending, by the resources mediation PDF, a corresponding response message to the NAAF, wherein the response message comprising processing results information of each request.

16. The method according to claim 5, further comprising:
after executing the corresponding command, returning, by the BGF, a confirmation message to the resources mediation PDF; and
sending, by the resources mediation PDF, a corresponding response message to the NAAF, wherein the response message comprising processing results information of each request.

17. The method according to claim 6, further comprising:
after executing the corresponding command, returning, by the BGF, a confirmation to the resources mediation PDF; and
sending, by the resources mediation PDF, a corresponding response message to the NAAF, wherein the response message comprising processing results information of each request.

18. The method according to claim 9, further comprising:
sending, by the resources mediation PDF, the resources unavailable indication message to the NAAF.

19. The method according to claim 10, further comprising:
sending, by the resources mediation PDF, the resources unavailable indication message to the NAAF.

20. The method according to claim 11, further comprising:
sending, by the resources mediation PDF, the resources unavailable indication message to the NAAF.

21. A system for implementing resources reservation in an access configuration mode in a next generation network (NGN), comprising:

a network access additional function entity (NAAF) configured to send, when a user terminal accesses the network, a resources request message to a resources mediation policy decision function entity (PDF) according to a subscriber service level agreement in a subscriber configuration file, wherein the resources request message carries resources requirement parameters information requested by a user traffic;

the resources mediation PDF, configured to check, after receiving the resources request message, whether the corresponding resources request is consistent with related network operation policy rules, check whether there are available resources meeting the resources requirement in the related transport networks, make an admission decision for the corresponding resources request according to a checking result, send an admission installation command to a border gateway function entity (BGF) if the corresponding resources request is admitted, and set corresponding admission decision parameters information in the BGF; and the BGF configured to perform forwarding operations on the user traffic entering the network according to the admission decision parameters information.

22. The system according to claim 21, wherein the resources mediation PDF is further configured to determine access networks and core networks related to the user traffic after receiving the resources request message, interact with a transport resources control function entity (TRCF) in the access networks and the core networks, check the availability of transport resources within the networks, and send the admission installation command or the admission modification command to the BGF after deciding that the resources are available.

* * * * *